(12) United States Patent
Lin

(10) Patent No.: US 7,040,493 B2
(45) Date of Patent: May 9, 2006

(54) GARDEN TOOL RACK

(75) Inventor: Pei-Ying Lin, Taichung Hsien (TW)

(73) Assignee: Global Industries Holdings Ltd., Nassau (BS)

( * ) Notice: Subject to any disclaimer, the term of this patent is extended or adjusted under 35 U.S.C. 154(b) by 205 days.

(21) Appl. No.: 10/747,338

(22) Filed: Dec. 29, 2003

(65) Prior Publication Data
US 2005/0145586 A1 Jul. 7, 2005

(51) Int. Cl.
A47F 7/00 (2006.01)

(52) U.S. Cl. ..................................... 211/70.6

(58) Field of Classification Search ............... 211/70.6, 211/60.1; 248/156, 530; 206/373; D8/11
See application file for complete search history.

(56) References Cited

U.S. PATENT DOCUMENTS

| 5,390,944 | A * | 2/1995 | Sherwin | 280/47.35 |
| 6,213,314 | B1 * | 4/2001 | Beemer | 211/70.6 |
| 6,530,487 | B1 * | 3/2003 | Berry | 211/70.6 |
| 6,848,587 | B1 * | 2/2005 | Chao | 211/70.6 |

* cited by examiner

Primary Examiner—Sarah Purol
(74) Attorney, Agent, or Firm—Levenfeld Pearlstein; Leon I. Edelson; William C. Clarke

(57) ABSTRACT

A garden tool rack includes a hollow rack body having a center upright barrel adapted to hold an extension handlebar for garden tool, and a plurality of plugholes spaced around the upright barrel, tool holders detachably inserted into the plugholes of the rack body and adapted to hold garden tools, collapsible anchoring devices respectively extended from the bottom wall of the rack body and turnable between a vertical operative position for securing the rack body to the soil and a horizontal non-operative position.

14 Claims, 9 Drawing Sheets

GARDEN TOOL RACK

BACKGROUND OF THE INVENTION

1. Field of the Invention

The present invention relates to a garden tool rack and, more particularly to such a garden tool rack, which can conveniently be carried by hand after loading of a set of garden tools.

2. Description of the Related Art

For cultivation of the soil and taking care of a garden, a variety of garden tools may be used. Regular garden tools include dibble, rack, digging fork, mattock draw hoe, shears, garden trowel, cultivator, etc. These garden tools have different shapes and sizes for different purposes. When gardening, garden tools may be scattered over the ground, and people may be injured by the scattered garden tools accidentally. Further, it is inconvenient to carry a set of garden tools to the jobsite. After gardening, the user must spend a lot of time to collect the scattered garden tools.

SUMMARY OF THE INVENTION

The present invention has been accomplished under the circumstances in view. It is the main object of the present invention to provide a garden tool rack, which holds a set of garden tools in good order. It is another object of the present invention to provide a garden tool rack, which can conveniently be carried by hand after loading of a set of garden tools. It is still another object of the present invention to provide a garden tool rack, which can stably be positioned in the soil when gardening.

To achieve these and other objects of the present invention, the garden tool rack comprises a hollow rack body, the hollow rack body comprising a top wall, a bottom wall, an upright barrel upwardly extended from the center of the top wall and adapted to hold an extension handlebar for garden tool, and a plurality of plugholes vertically downwardly extended from the top wall and spaced around the upright barrel; a plurality of tool holders respectively mounted in the plugholes of the hollow rack body and adapted to hold garden tools; at least one collapsible anchoring device extended from the bottom wall of the hollow rack body and turnable between a vertical operative position for securing the hollow rack body to the soil and a horizontal non-operative position; a set of garden tools, the garden tools each having a handle and a plug rod axially extended from the handle and insertable into the tool holders; and an extension handlebar connectable to the plug rod of each the garden tool and insertable into the upright barrel of the hollow rack body.

DETAILED DESCRIPTION OF THE PREFERRED EMBODIMENT

Figure 1:
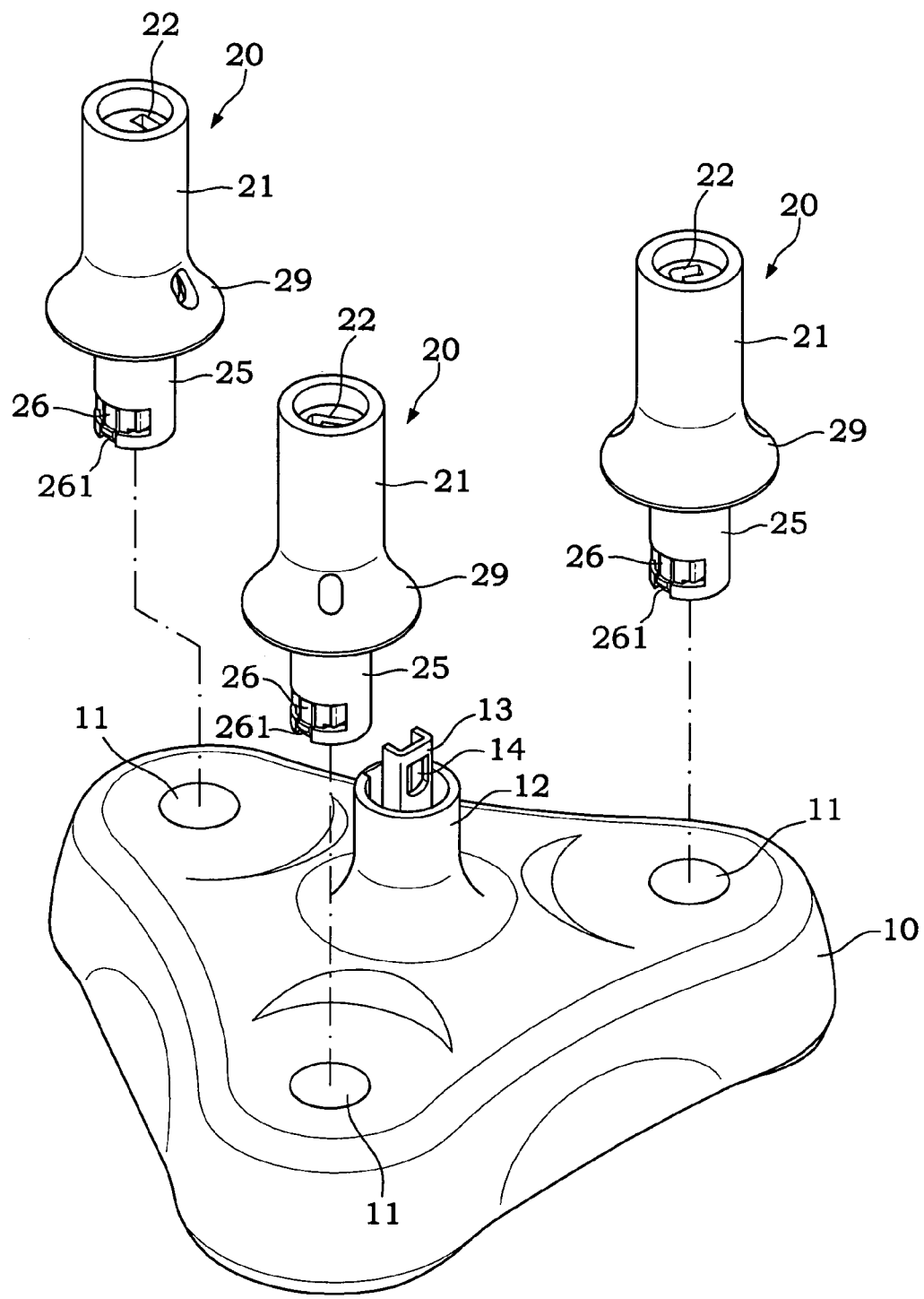
FIG. 1 is an exploded view of a garden tool rack according to the present invention.
Figure 2:
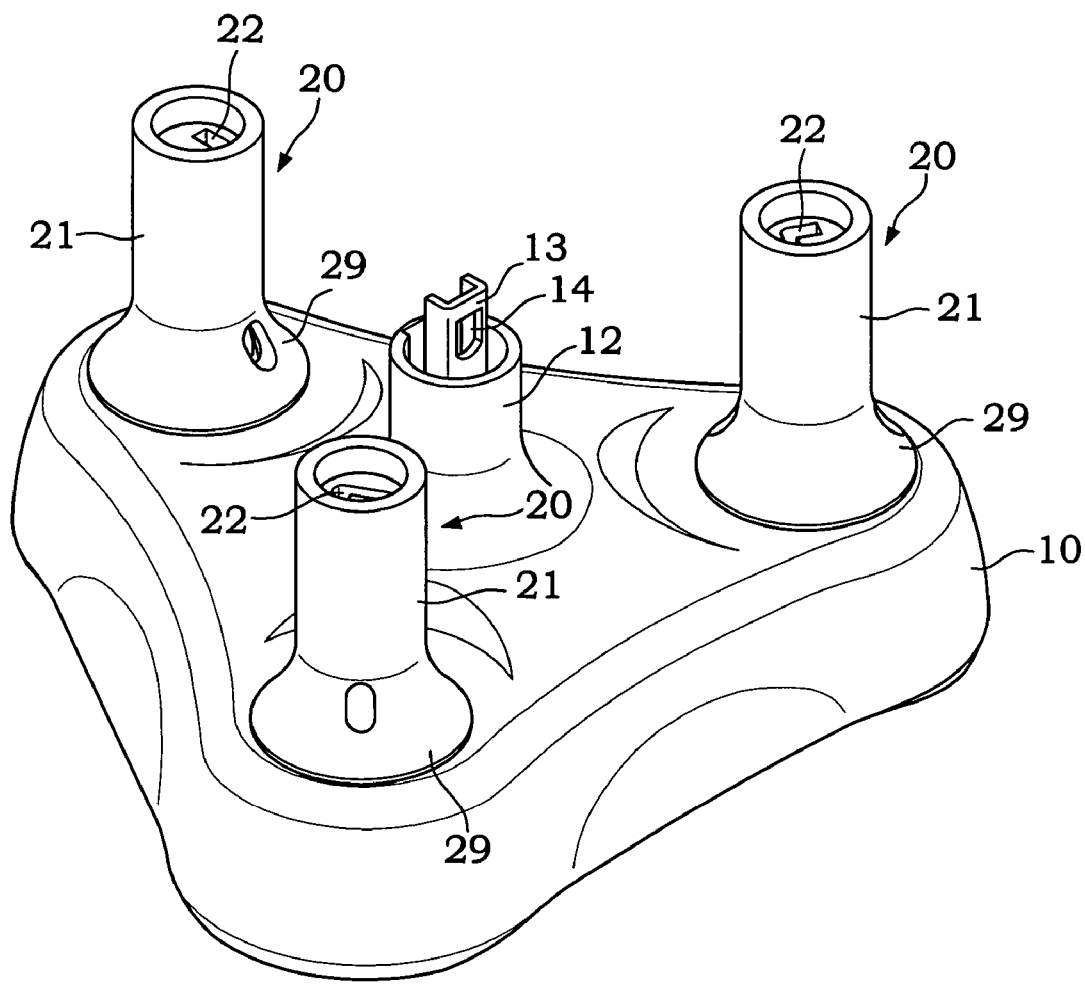
FIG. 2 is an oblique top elevation of the garden tool rack according to the present invention.

Referring to FIGS. 1–4, a garden tool rack in accordance with the present invention is shown comprised of a rack body 10, a plurality of hollow cylindrical tool holders 20, and a plurality of anchoring devices 30.

Referring to FIGS. 1 and 2 again, the rack body 10 is a hollow shell molded from plastics, comprising an upright barrel 12 upwardly extended from the center of the top wall, a plug rod 13 axially suspended in the upright barrel 12 and upwardly protruding over the top side of the upright barrel 12, the plug rod 13 having a locating hole 14 near the top, and a plurality of plugholes 11 vertically downwardly extended from the top wall and spaced around the upright barrel 12. The plug rod 13 has a curved cross section, for example, a U-shaped cross section.

Referring to FIGS. 1 and 2 again, each tool holder 20 comprises a top holder body 21, a bottom mounting tube 25 for insertion into one plughole 11 of the rack body 10, a skirt-like shoulder 29 provided between the top holder body 21 and the bottom mounting tube 25 and adapted to support the top holder body 21 above the top wall of the rack body 10, a plughole 22 axially formed in the top holder body 21 and curved in transverse direction, and a retaining spring leaf 26 formed integral with the peripheral wall of the bottom mounting tube 25 and adapted to secure the bottom mounting tube 25 to one plughole 11 of the rack body 10. The retaining spring leaf 26 has one end (the fixed end) formed integral with the peripheral wall of the bottom mounting tube 25, and the other end (the free end) terminating in a hooked portion 261 for hooking on the bottom edge of the peripheral wall of the plughole 11 receiving the bottom mounting tube 25.

Figure 3:
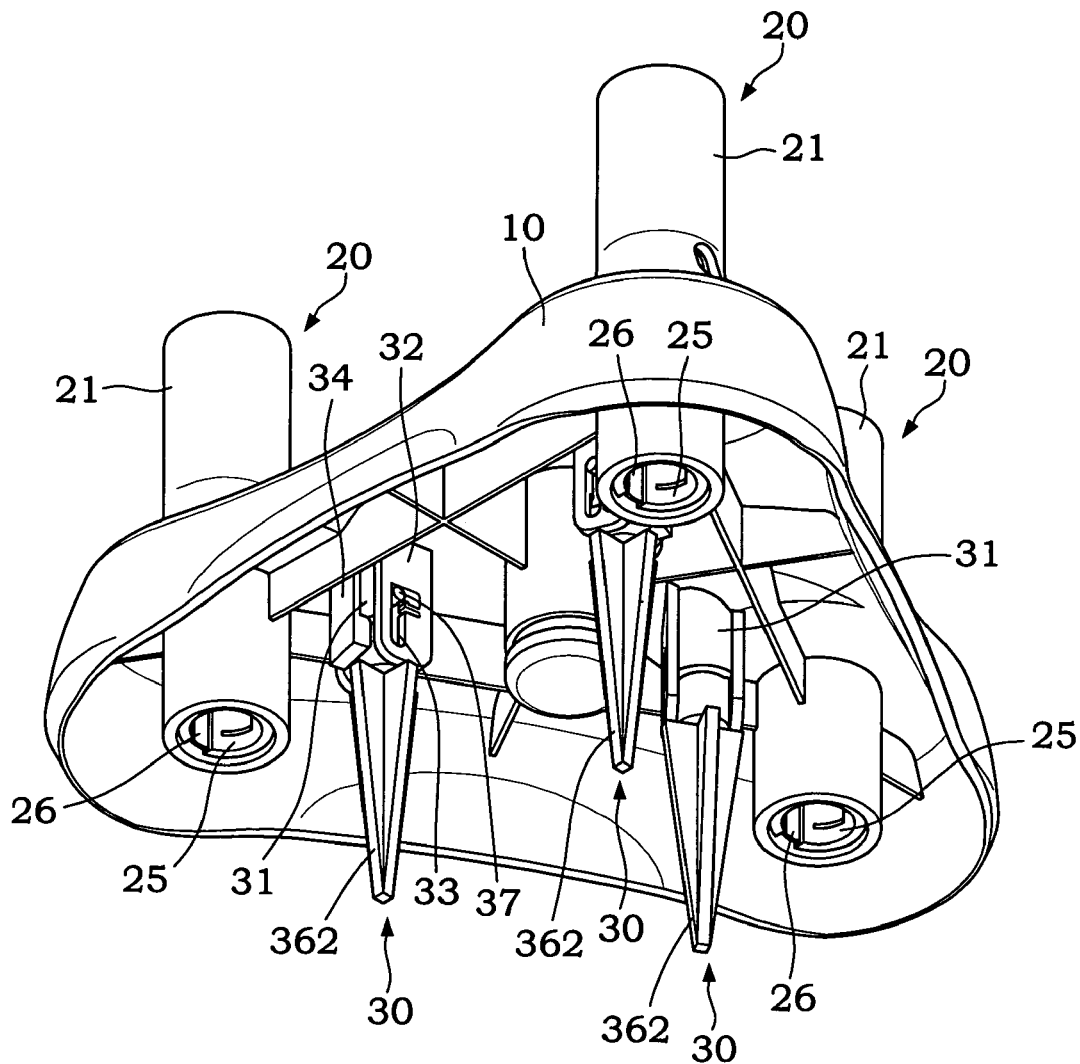
FIG. 3 is an oblique bottom elevation of the garden tool rack according to the present invention.
Figure 4:
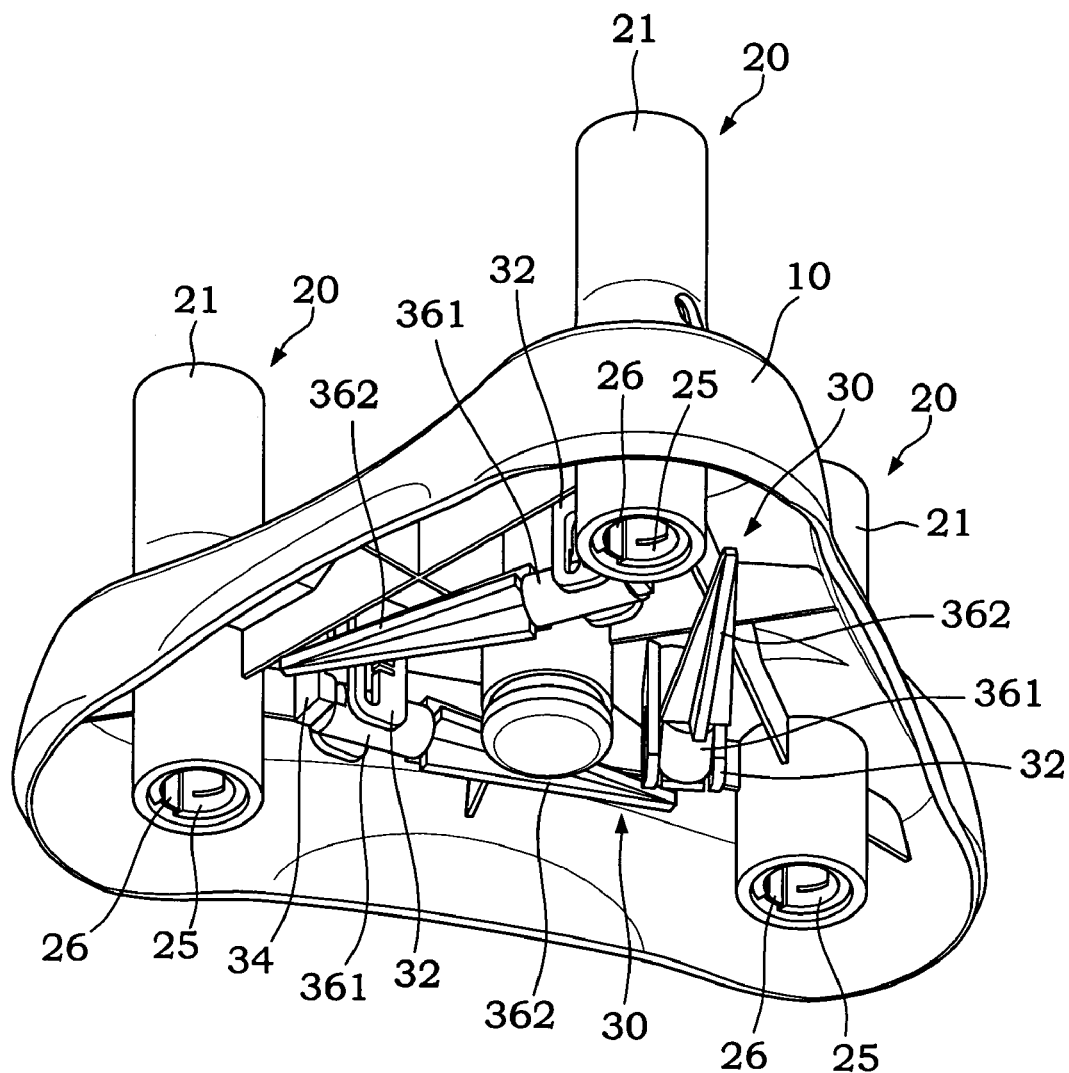
FIG. 4 is similar to FIG. 3 but showing the received status of the anchoring devices.
Figures 5A, 5B, 5C:
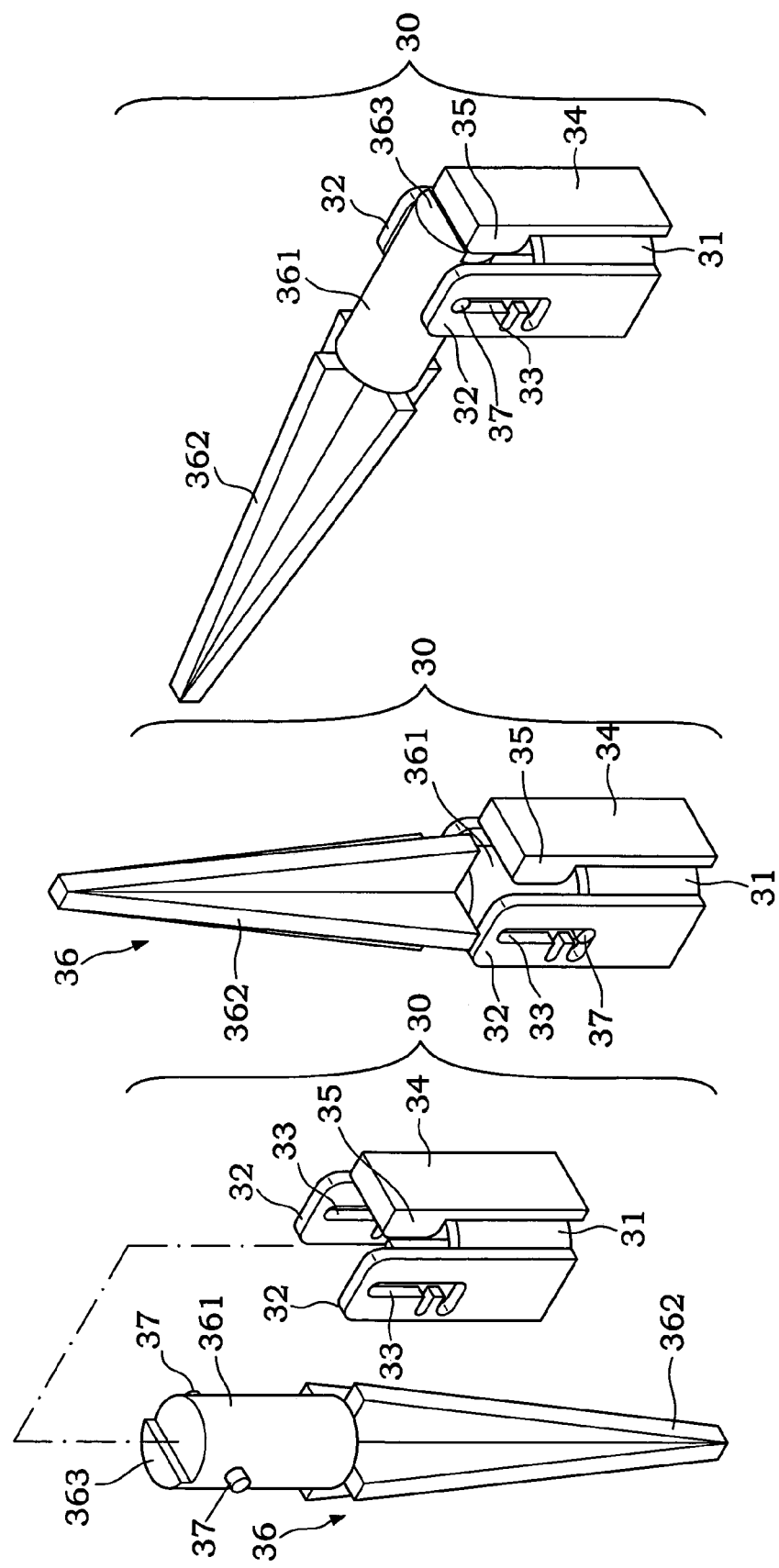
FIG. 5A is an exploded view of an anchoring device for the garden tool rack according to the present invention.
FIG. 5B is an assembly view of the anchoring device shown in FIG. 5A, showing the anchoring tip set in the extended operative position.
FIG. 5C is similar to FIG. 5B but showing the anchoring tip turned to the received non-operative position.

Referring to FIGS. 5A–5C and FIGS. 3 and 4 again, each anchoring device 30 is comprised of a base block 31 downwardly extended from the bottom wall of the hollow rack body 10, and an anchoring tip 36 fastened pivotally with the base block 31. The base block 31 comprises two parallel lugs 32 axially disposed at two sides, each lug 32 defining a longitudinal sliding slot 33, a spring plate 34 equally spaced from the lugs 32 at one side and terminating in a stop flange 35. The anchoring tip 36 comprises a cylindrical coupling portion 361 inserted in between the lugs 32 of the base block 31, a conical sharp endpiece 362 axially extended from one end of the cylindrical coupling portion 361 and disposed outside the base block 31, two pivot rods 37 bilaterally perpendicularly extended from the periphery of the cylindrical coupling portion 361 and respectively inserted through the longitudinal sliding slots 33 of the lugs 32, and a step 363 formed at the other end of the cylindrical coupling portion 361 remote from the conical sharp endpiece 362. When assembled, the anchoring tip 36 can be turned relative to the base block 31 between the extended operative position as shown in FIGS. 3 and 5B, and the received non-operative position as shown in FIGS. 4 and 5C. When set the extended operative position, the conical sharp endpiece 362 of each anchoring device 30 can be fastened to the soil to hold the garden tool rack on the soil. When set in the received non-operative position, the stop flange 35 of the spring plate 34 is stopped against the step 363 to hold the anchoring tip 36 in the received position.

Figure 6:
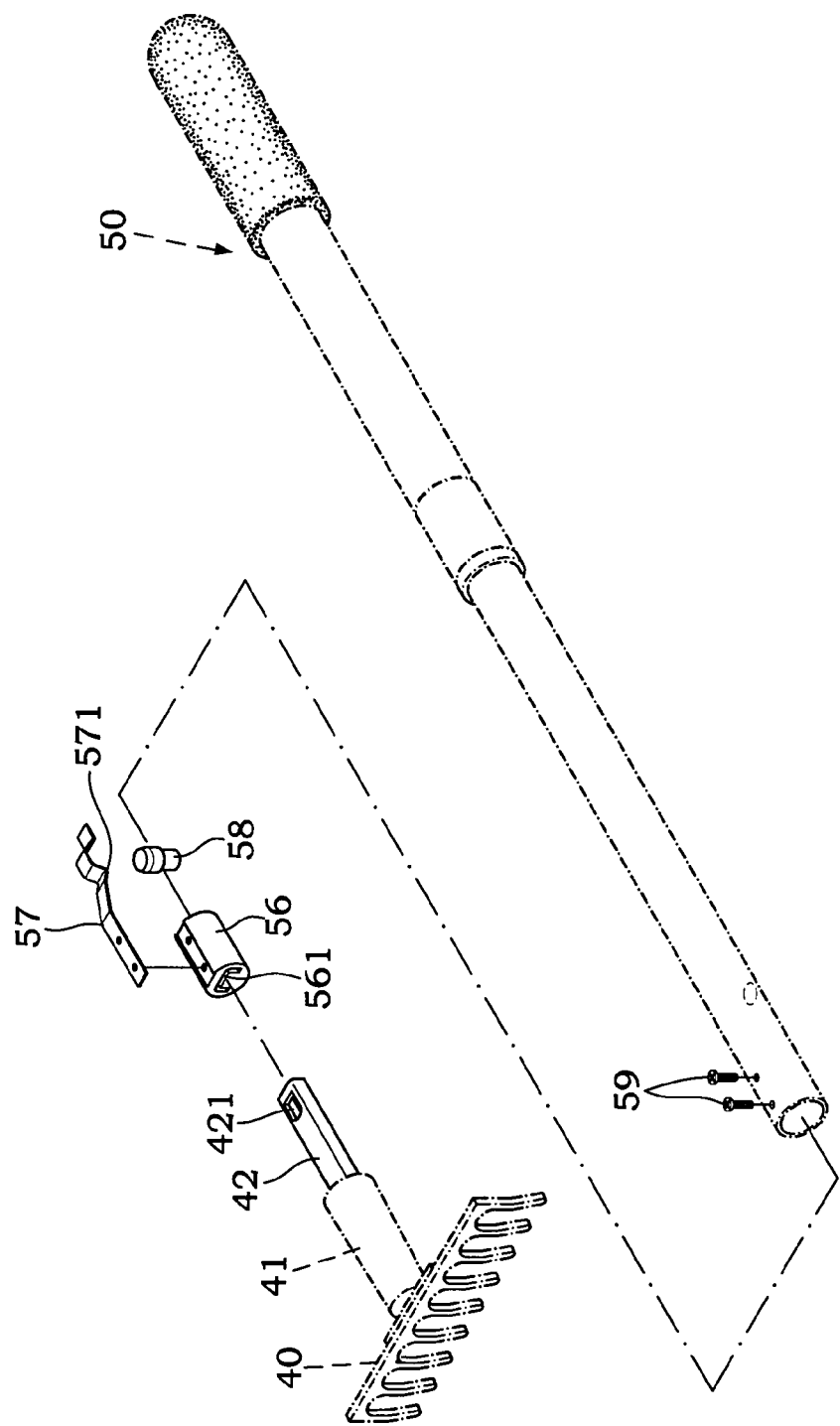
FIG. 6 is an exploded view of a garden tool and a retractable extension handlebar according to the present invention.
Figure 8:
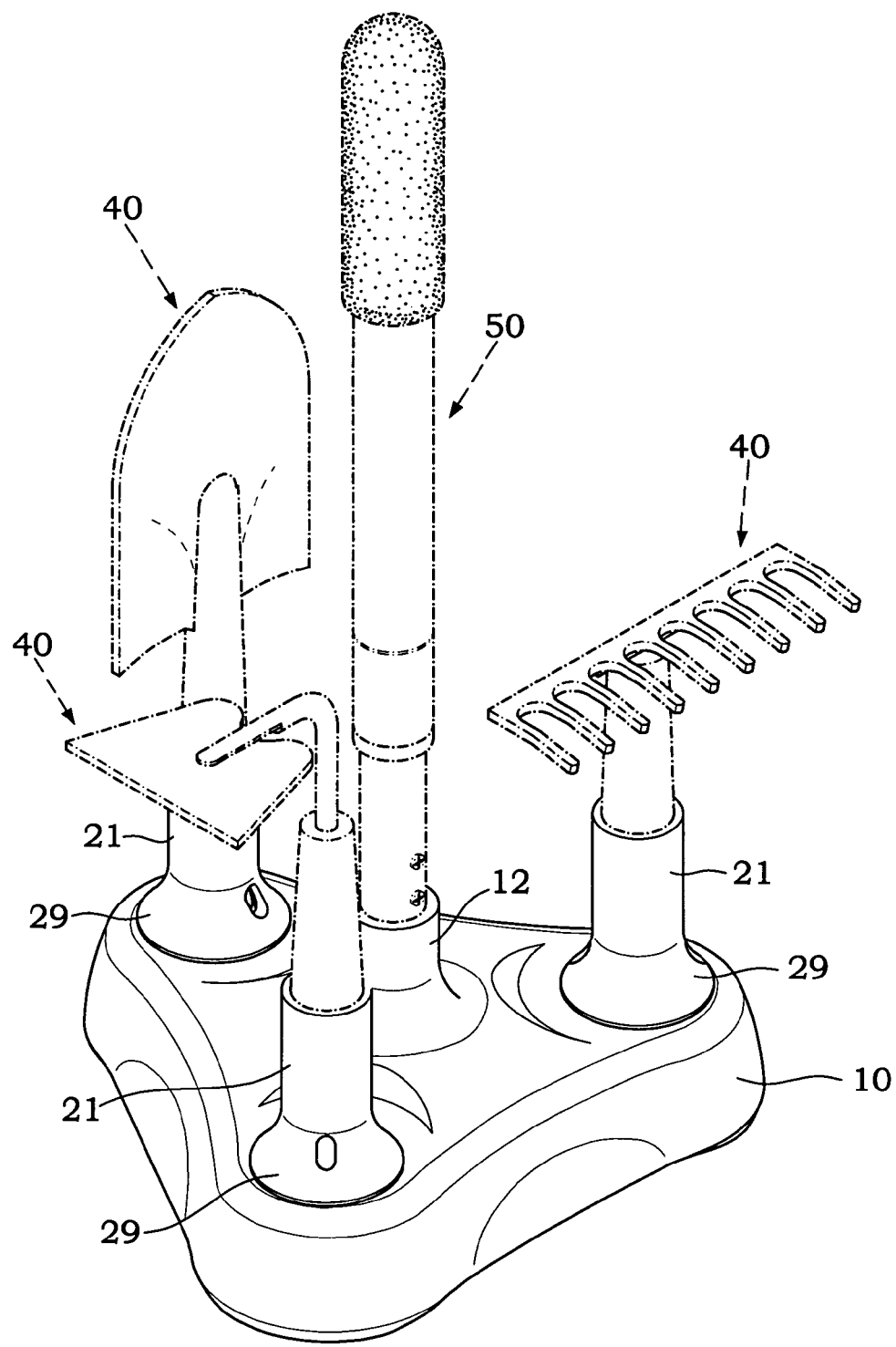
FIG. 8 is a schematic drawing showing a set of garden tools carried on the garden tool rack according to the present invention.

Referring to FIGS. 6 and 8, the garden tool 40 has a handle 41 and a plug rod 42 axially extended from the handle 41. The plug rod 42 has a locating hole 421 near the remote end. By means of the plug rod 42, the garden tool 40 can be inserted into the plughole 22 of one tool holder 20 in one plughole 11 of the rack body 10. Further, after separation from the plug rod 42 of the garden tool 40, the retractable extension handlebar 50 can be fastened to the upright barrel 12.

Figure 7C:
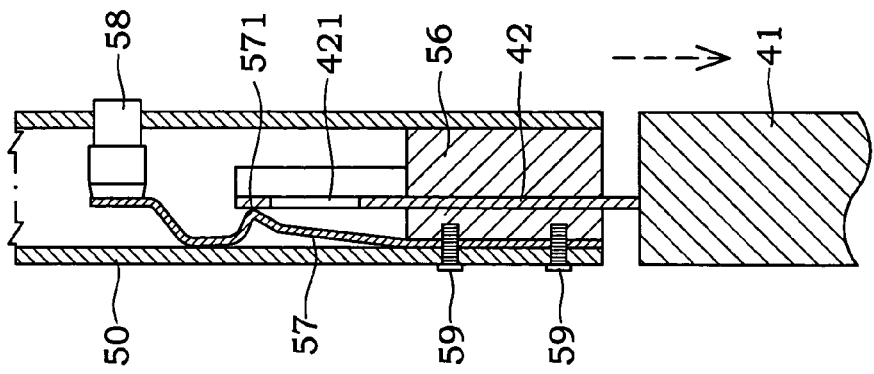
FIG. 7C is similar to FIG. 7B but showing the button pressed, the protruded retaining portion of the retaining spring member disengaged from the locating hole of the plug rod of the garden tool.
Figure 7B:
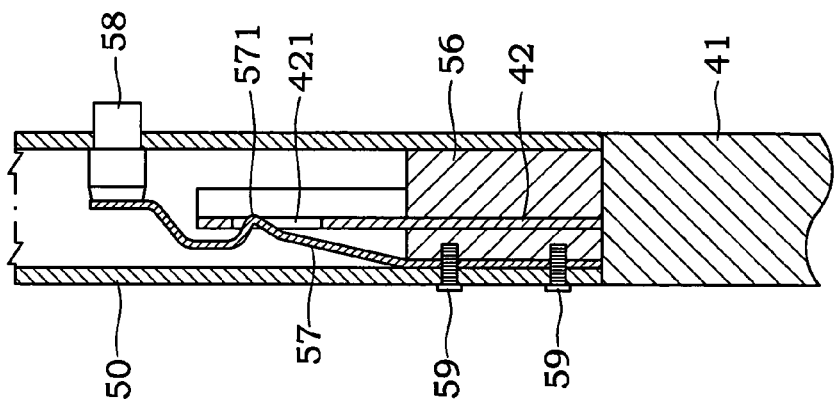
FIG. 7B is similar to FIG. 7A but showing the plug rod of one garden tool inserted into the hollow insert, the protruded retaining portion of the retaining spring member engaged into the locating hole of the plug rod of the garden tool.
Figure 7A:
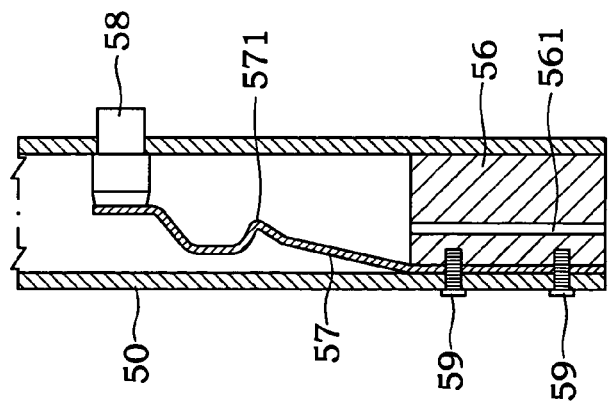
FIG. 7A is a sectional view showing the positioning of the hollow insert and the retaining spring member in the retractable extension handlebar according to the present invention.

Referring to FIGS. 7A~7C and FIG. 6 again, the retractable extension handlebar 50 has a hollow insert 56 and a retaining spring member 57 fixedly fastened to the inside of one end thereof with screws 59. The hollow insert 56 defines an axially extended through hole 561 for receiving the plug rod 42 of the garden tool 40. The retaining spring member 57 has a protruded retaining portion 571 adapted to engage the locating hole 421 of the plug rod 42. Further, a button 58 is installed in the retractable extension handle 50 for pressing by hand to force the protruded retaining portion 571 of the retaining spring member 57 away from the locating hole 421 of the plug rod 42 for enabling the garden tool 40 to be removed from the retractable extension handlebar 50. When inserted the retractable extension handlebar 50 into the upright barrel 12 of the rack body 10 after disconnection of the retractable extension handlebar 50 from the garden tool 40, the plug rod 13 is inserted into the axially extended through hole 561 of the hollow insert 56, and the protruded retaining portion 571 of the retaining spring member 57 is forced by the spring power of the retaining spring member 57 into engagement with the locating hole 14 of the plug rod 13, and therefore the retractable extension handlebar 50 is positively secured to the upright barrel 12 (see also FIGS. 1 and 8).

Figure 9:
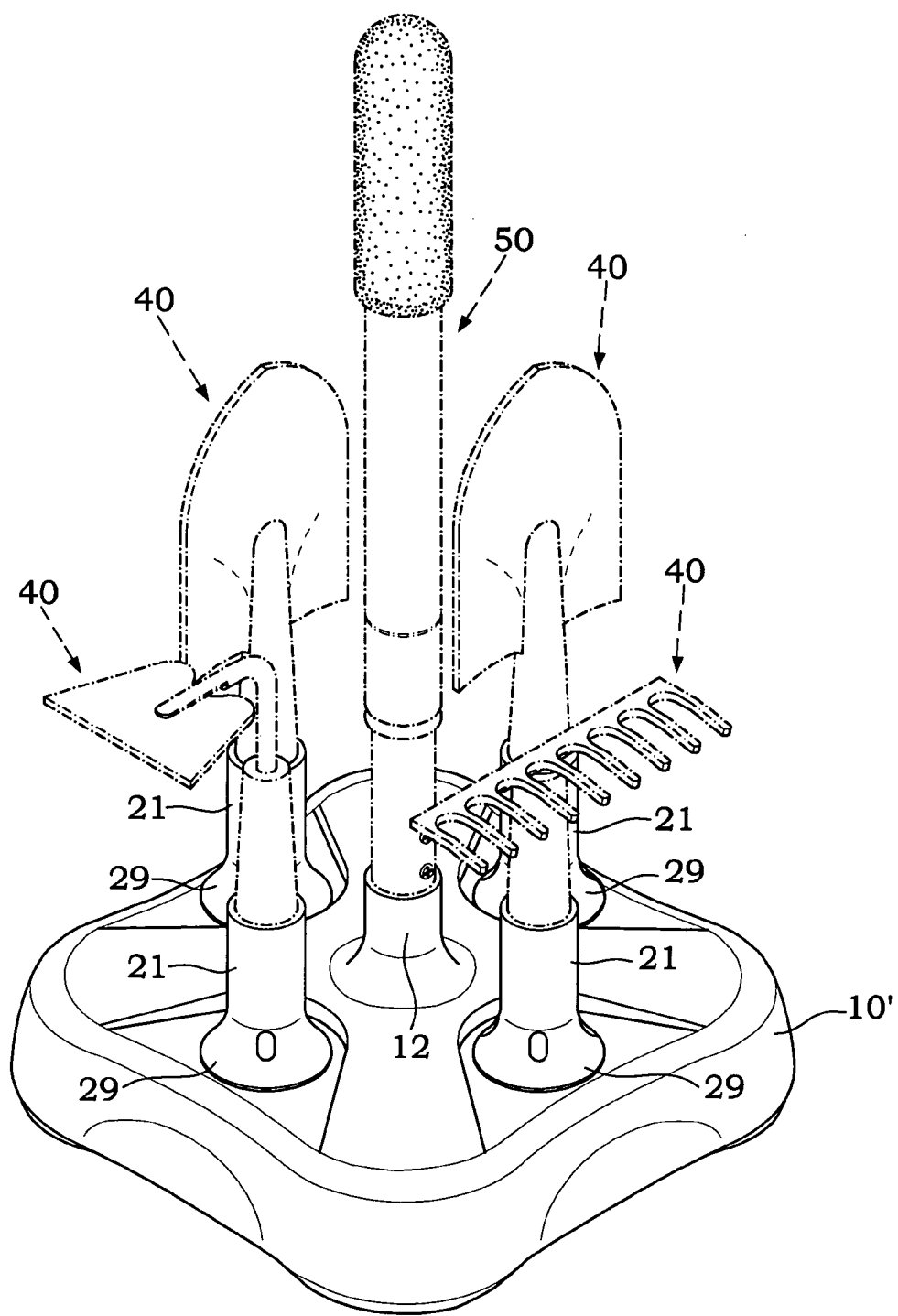
FIG. 9 shows an alternate form of the present invention.

According to the embodiment shown in FIGS. 1~4 and FIG. 8, the rack body 10 of the garden tool rack has a triangular profile. FIG. 9 shows an alternate form of the present invention. According to this embodiment, the rack body 10' is a rectangular hollow shell equipped with four hollow cylindrical tool holders 20.

Referring to FIGS. 8 and 9 again, garden tools 40 are set in the hollow cylindrical tool holders 20 near the border area of the rack body 10 or 10', and the retractable extension handlebar 50 is set in the upright barrel 12 at the center of the rack body 10 or 10'. Through the retractable extension handlebar 50, the user can carry the garden tool rack with full set of garden tools 40 with one single hand conveniently. During cultivation of the soil, the user can fasten the anchoring devices 30 to the soil, and use the retractable extension handlebar 50 with either of the garden tools 40.

A prototype of garden tool rack has been constructed with the features of FIGS. 1~9. The garden tool rack functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A garden tool rack comprising:
  a hollow rack body, said hollow rack body comprising a top wall, a bottom wall, an upright barrel upwardly extended from the center of said top wall and adapted to hold an extension handlebar for garden tool, and a plurality of plugholes vertically downwardly extended from said top wall and spaced around said upright barrel;
  a plurality of tool holders respectively mounted in the plugholes of said hollow rack body and adapted to hold garden tools;
  at least one collapsible anchoring device extended from the bottom wall of said hollow rack body and turnable between a vertical operative position for securing said hollow rack body to the soil and a horizontal non-operative position;
  a set of garden tools, said garden tools each having a handle and a plug rod axially extended from said handle and insertable into said tool holders; and
  an extension handlebar connectable to the plug rod of each said garden tool and insertable into the upright barrel of said hollow rack body.

2. The garden tool rack as claimed in claim 1, wherein said tool holders each comprise a top holder body adapted to hold one said garden tool, a bottom mounting tube axially downwardly extended from said top holder body for fastening to one plughole of said hollow rack body.

3. The garden tool rack as claimed in claim 2, wherein each said tool holder further comprises a tool holder plughole axially formed in the top holder body of the respective tool holder and adapted to accommodate the plug rod of one said garden tool.

4. The garden tool rack as claimed in claim 3, wherein the plug rod of each said garden tool has a curved cross section; the tool holder plughole of each said tool holder has a curved cross section fitting the curved cross section of the plug rod of each said garden tool.

5. The garden tool rack as claimed in claim 2, wherein each said tool holder further comprises a retaining spring member formed integral with the peripheral wall of the bottom mounting tube of the respective tool holder, said retaining spring member having a hooked portion for hooking on the bottom wall of said hollow rack body.

6. The garden tool rack as claimed in claim 2, wherein each said tool holder further comprises a skirt-like shoulder provided between the top holder body and bottom mounting tube of the respective tool holder and adapted to support the respective tool holder above the top wall of said hollow rack body.

7. The garden tool rack as claimed in claim 1, wherein said at least one anchoring device each comprises a base block having two sides downwardly extended from the bottom wall of said hollow rack body, and an anchoring tip fastened pivotally with said base block, said base block comprising two parallel lugs axially disposed at said two sides, said lugs each having a longitudinal sliding slot, said anchoring tip comprising two pivot rods respectively coupled to the longitudinal sliding slots of said lugs for enabling said anchoring tip to be turned relative to said base block between said vertical operative position and said horizontal non-operative position.

8. The garden tool rack as claimed in claim 7, wherein the base block of each said anchoring device further comprises a spring plate equally spaced from said lugs said spring plate having a stop flange for stopping against a step at one end of said anchoring tip to hold said anchoring tip in said horizontal non-operative position.

9. The garden tool rack as claimed in claim 1, wherein said hollow rack body further comprises a plug rod axially suspended in said upright barrel; said extension handlebar comprises a hollow insert fixedly provided in one end thereof, said hollow insert having an axially extended through hole for receiving the plug rod of said hollow rack body.

10. The garden tool rack as claimed in claim 9, wherein the plug rod of said hollow rack body has a curved cross section; the through hole of said hollow insert has a curved cross section fitting the curved cross section of the plug rod of said rack body.

11. The garden tool rack as claimed in claim 9, wherein the plug rod of said hollow rack body has a locating hole; said extension handlebar further comprises a retaining spring member extended from said hollow insert and suspended on the inside, said retaining spring member having a protruded retaining portion adapted to engage the locating hole of the plug rod of said hollow rack body, and a button for pressing by hand to curve said retaining spring member and to further disengage said protruded retaining portion of said retaining spring member from the locating hole of the plug rod of said hollow rack body.

12. The garden tool rack as claimed in claim 1, wherein said hollow rack body has a triangular profile; the number of the plugholes of said hollow rack body is three, the three plugholes of said hollow rack body are respectively disposed in three corners of said hollow rack body and respectively holding one of said tool holders.

13. The garden tool rack as claimed in claim 12, wherein the number of said at least one anchoring device is three, and the three anchoring devices are respectively extended from the bottom wall of said hollow rack body and spaced between each two adjacent plugholes of said hollow rack body.

14. The garden tool rack as claimed in claim 1, wherein said hollow rack body has a rectangular profile; the number of the plugholes of said hollow rack body is four; the four plugholes of said hollow rack body are respectively disposed in four corners of said hollow rack body and respectively holding one of said tool holders.

* * * * *